(12) United States Patent
Andrade et al.

(10) Patent No.: US 12,359,434 B2
(45) Date of Patent: Jul. 15, 2025

(54) ROOFING MEMBRANE AND ROOFING SYSTEM INCLUDING ROOFING MEMBRANE

(71) Applicant: BMIC LLC, Dallas, TX (US)

(72) Inventors: Andrew Erick Andrade, Hackensack, NJ (US); Michael Dougherty, Mount Arlington, NJ (US); Adem Chich, Kearny, NJ (US)

(73) Assignee: BMIC LLC, Dallas, TX (US)

( * ) Notice: Subject to any disclaimer, the term of this patent is extended or adjusted under 35 U.S.C. 154(b) by 0 days.

(21) Appl. No.: 18/941,491

(22) Filed: Nov. 8, 2024

(65) Prior Publication Data

US 2025/0146284 A1 May 8, 2025

Related U.S. Application Data

(60) Provisional application No. 63/597,225, filed on Nov. 8, 2023.

(51) Int. Cl.
*E04D 5/00* (2006.01)
*B32B 15/08* (2006.01)
(Continued)

(52) U.S. Cl.
CPC .............. *E04D 5/10* (2013.01); *B32B 15/08* (2013.01); *B32B 15/14* (2013.01); *B32B 27/12* (2013.01); *B32B 27/20* (2013.01); *B32B 27/283* (2013.01); *B32B 2250/04* (2013.01); *B32B 2260/021* (2013.01); *B32B 2260/046* (2013.01); *B32B 2307/202* (2013.01); *B32B 2307/21* (2013.01); *B32B 2307/7376* (2023.05); *B32B 2419/06* (2013.01)

(58) Field of Classification Search
CPC .... E04D 5/00; E04D 5/08; E04D 5/10; B32B 15/00; B32B 15/02; B32B 15/08; B32B 15/14; B32B 27/12; B32B 2307/7376; B32B 27/20; B32B 27/283; B32B 2250/00; B32B 2250/04; B32B 2250/03; B32B 2260/021; B32B 2260/023; B32B 2260/046; B32B 2307/00; B32B 2307/202; B32B 2307/21; B32B 2419/06
See application file for complete search history.

(56) References Cited

U.S. PATENT DOCUMENTS

| | | |
|---|---|---|
| 3,726,754 A | 4/1973 | Coglianese et al. |
| 4,450,663 A | 5/1984 | Watkins |

(Continued)

*Primary Examiner* — Chi Q Nguyen
(74) *Attorney, Agent, or Firm* — GREENBERG TRAURIG, LLP (57) ABSTRACT

A system, including a roofing membrane installed above the roofing substrate, where the roofing membrane includes a polysiloxane layer, where the polysiloxane layer is an uppermost surface of the roofing membrane installed above the roofing substrate, a second layer, where the second layer includes a metal, and a reinforcement layer, where the second layer is between the polysiloxane layer and the reinforcement layer, where the second layer has at least one of the following: a thickness, a type of metal, a percentage of area of the polysiloxane layer covered by the second layer, or any combination thereof, sufficient to reduce by at least 65% a static charge on the polysiloxane layer when compared to a control roofing membrane without the second layer.

20 Claims, 1 Drawing Sheet

(51) Int. Cl.
    *B32B 15/14*     (2006.01)
    *B32B 27/12*     (2006.01)
    *E04D 5/10*     (2006.01)
    *B32B 27/20*     (2006.01)
    *B32B 27/28*     (2006.01)

(56) References Cited

U.S. PATENT DOCUMENTS

| | | | |
|---|---|---|---|
| 11,242,684 B2* | 2/2022 | Wang | B32B 27/40 |
| 11,767,673 B2 | 9/2023 | Yang et al. | |
| 11,807,785 B2* | 11/2023 | Lem | E04D 5/10 |
| 11,987,986 B2* | 5/2024 | Wang | B32B 7/12 |
| 12,173,509 B2* | 12/2024 | Tang | E04D 5/06 |
| 2007/0193167 A1* | 8/2007 | Bruce | B32B 27/08 |
| | | | 52/408 |
| 2012/0244340 A1* | 9/2012 | Peng | B32B 27/08 |
| | | | 428/521 |
| 2015/0152643 A1* | 6/2015 | Hubbard | C08J 5/18 |
| | | | 156/331.7 |
| 2016/0312470 A1* | 10/2016 | Wang | B32B 27/12 |
| 2019/0003185 A1* | 1/2019 | Wang | B32B 15/085 |
| 2021/0095474 A1* | 4/2021 | Yang | B32B 15/043 |
| 2021/0164228 A1* | 6/2021 | Fu | B32B 5/028 |
| 2021/0257690 A1* | 8/2021 | Kilhenny | B32B 25/04 |
| 2024/0410173 A1* | 12/2024 | Zheng | E04D 5/08 |

\* cited by examiner

FIG. 6

ROOFING MEMBRANE AND ROOFING SYSTEM INCLUDING ROOFING MEMBRANE

CROSS-REFERENCE TO RELATED APPLICATION

This application is a Section 111(a) application relating to and claiming the benefit of commonly owned, U.S. Provisional Patent Application Ser. No. 63/597,225, filed Nov. 8, 2023, entitled "ROOFING MEMBRANE AND ROOFING SYSTEM INCLUDING ROOFING MEMBRANE," the contents of which is incorporated herein by reference in its entirety.

FIELD

The present invention relates to a roofing membrane, and, more particularly, to a roofing membrane having reduced static charge on the surface of the membrane.

BACKGROUND

A known roofing system includes a roofing membrane with a polysiloxane top layer, which is installed above a roofing substrate. Often, during installation, the roofing membrane becomes covered with dirt, dust, and/or other debris due, at least in part, to the top layer having a substantial static charge.

SUMMARY

The Claims, rather than the Summary, define covered embodiments of the present invention. The Summary is a high-level overview of various aspects of the invention, and introduces some concepts that are further described in the Detailed Description below. The Summary is not intended to identify key or essential features of the claimed subject matter, and also is not intended to be used in isolation to determine the scope of the claimed subject matter. Instead, the claimed subject matter should be understood by reference to appropriate portions of the Specification and drawings, as well as to each claim.

In some embodiments, the techniques described herein relate to a system, including: a roofing substrate; and a roofing membrane, wherein the roofing membrane is located on the roofing substrate, wherein the roofing membrane includes: a first layer, wherein the first layer includes a polysiloxane, a second layer, wherein the second layer includes a metal having a conductivity, and a reinforcement layer, wherein the second layer is located between the first layer and the reinforcement layer.

In some embodiments, the techniques described herein relate to a system wherein the second layer has: a sufficient thickness, a sufficient metal conductivity and a sufficient area so as to reduce a static charge on a surface of the first layer by at least 65%, as compared to a control roofing membrane, wherein the control roofing membrane is identical to the roofing membrane except for the second layer.

In some embodiments, the techniques described herein relate to a system, wherein the polysiloxane layer further includes a polymer.

In some embodiments, the techniques described herein relate to a system, wherein the metal of the second layer includes at least one of copper, aluminum, silver, gold, steel, or brass.

In some embodiments, the techniques described herein relate to a system, wherein the first layer contacts and at least partially covers the second layer.

In some embodiments, the techniques described herein relate to a system, wherein the roofing membrane further includes: a fourth layer, wherein the fourth layer is between the first layer and the second layer, wherein the fourth layer includes a plurality of pores, wherein polysiloxane is embedded in the plurality of pores.

In some embodiments, the techniques described herein relate to a system, wherein the first layer contacts the second layer.

In some embodiments, the techniques described herein relate to a system, wherein the thickness of the second layer is 20 mm to 45 mm.

In some embodiments, the techniques described herein relate to a system, wherein the percentage of the area of coverage on the first layer is from 50 to 100%.

In some embodiments, the techniques described herein relate to a system, wherein the first layer includes: polysiloxane, and an antistatic additive dispersed throughout the polysiloxane, wherein the antistatic additive includes at least one of: polyethyleneimine, polymethylsilsesquioxane, a fatty acid ester, or any combination thereof, wherein an amount of antistatic additive is sufficient to reduce by at least 65% a static charge on the polysiloxane layer when compared to a control roofing membrane without the antistatic additive.

In some embodiments, the techniques described herein relate to a system, wherein the antistatic additive includes 0.5 to 5.0 weight % of polyethyleneimine.

In some embodiments, the techniques described herein relate to a system, wherein the antistatic additive includes 0.5 to 5.0 weight % of polymethylsilsesquioxane.

In some embodiments, the techniques described herein relate to a system, wherein the antistatic additive includes 0.5 to 5.0 weight % of fatty acid ester.

In some embodiments, the techniques described herein relate to a system, wherein the fatty acid ester includes ethoxylated alkyl amine.

In some embodiments, the techniques described herein relate to a system, wherein the fatty acid ester includes ethoxylated alkyl amine.

In some embodiments, the techniques described herein relate to a roofing membrane including: a first layer, wherein the first layer includes a polysiloxane, a second layer, wherein the second layer includes a metal having a conductivity, and a reinforcement layer, wherein the second layer is located between the first layer and the reinforcement layer.

In some embodiments, the techniques described herein relate to a system wherein the second layer has: a sufficient thickness, a sufficient metal conductivity and a sufficient area so as to reduce a static charge on a surface of the first layer by at least 65%, as compared to a control roofing membrane, wherein the control roofing membrane is identical to the roofing membrane except for the second layer.

In some embodiments, the techniques described herein relate to a system, wherein the polysiloxane layer further includes a polymer.

In some embodiments, the techniques described herein relate to a system, wherein the metal of the second layer includes at least one of copper, aluminum, silver, gold, steel, or brass.

In some embodiments, the techniques described herein relate to a roofing membrane, wherein the first layer includes: polysiloxane, and an antistatic additive dispersed throughout the polysiloxane, wherein the antistatic additive includes at least one of: polyethyleneimine, polymethylsilsesquioxane, a fatty acid ester, or any combination thereof, wherein an amount of antistatic additive is sufficient to reduce by at least 65% a static charge on the polysiloxane layer when compared to a control roofing membrane without the antistatic additive.

BRIEF DESCRIPTION OF THE DRAWINGS

This section refers to the drawings that form a part of this disclosure, and which illustrate some of the embodiments of structure, materials, and/or methods of the present invention described herein.

DETAILED DESCRIPTION

In addition to the benefits and improvements that the Specification discloses, other objects and advantages that the Specification provides will become apparent from the following description taken in conjunction with the accompanying figures. Although the description discloses and describes detailed embodiments of the present disclosure, the disclosed embodiments are merely illustrative of the disclosure that may be embodied in various forms. In addition, each of the examples given regarding the various embodiments of the disclosure are intended to be illustrative, and not restrictive.

In some embodiments, the present invention provides a roofing membrane. In some embodiments, the present invention provides a roofing system including the roofing membrane. In some embodiments, the present invention provides the roofing system including the roofing membrane installed on or above the roofing substrate. In some embodiments, the present invention provides the roofing system including the roofing membrane and one or more other components installed on or above the roofing substrate. In some embodiments, the present invention provides a method of installing the roofing membrane on or above the roofing substrate. In some embodiments, the present invention provides a method of installing the roofing membrane and one or more other components on or above the roofing substrate. In some embodiments, the present invention provides a method of manufacturing the roofing membrane.

In some embodiments, the roofing membrane may be installed on a flat slope roofing substrate. As used herein, a "flat slope roofing substrate" is a roofing substrate having a pitch of Y/X, where Y and X are in a ratio of 1:12 or less, where Y corresponds to the "rise" of the roof or roofing substrate, and where X corresponds to the "run" of the roof or roofing substrate.

In some embodiments, the roofing substate comprises one or more of wood, foam, concrete, metal, and/or one or more other materials, and/or combinations thereof.

In some embodiments, the roofing membrane reduces a static charge on a top surface of the roofing membrane. In some embodiments, the roofing membrane reduces a static charge on a top surface of the roofing membrane as compared to a control roofing membrane, as further described.

In some embodiments, the roofing membrane comprises a first layer comprising a polysiloxane layer. In some embodiments, the polysiloxane layer is a top or uppermost layer of the roofing membrane when the roofing membrane is installed on or above the roofing substrate. In some embodiments, the top surface of the polysiloxane layer remains exposed to the environment, and/or may be visually observable, after installation of the roofing membrane on or above the roofing substrate.

In some embodiments, the polysiloxane layer comprises siloxane backbone. In some embodiments, the polysiloxane layer comprises polysiloxane and one or more additives, such as by not limited to a stabilizer, antioxidant, colorant, nucleating agent, mold release agent, dispersing agent, UV light absorber, UV light reflector, IR light absorber, IR light reflector, flame retardant, mold release agent, dye, pigment, antistatic additive, and/or one or more other additives, and/or combinations thereof.

In some embodiments, the polysiloxane layer has a thickness of 10 mm. In some embodiments, the polysiloxane layer has a thickness of 11 mm. In some embodiments, the polysiloxane layer has a thickness of 12 mm. In some embodiments, the polysiloxane layer has a thickness of 13 mm. In some embodiments, the polysiloxane layer has a thickness of 14 mm. In some embodiments, the polysiloxane layer has a thickness of 15 mm. In some embodiments, the polysiloxane layer has a thickness of 16 mm. In some embodiments, the polysiloxane layer has a thickness of 17 mm. In some embodiments, the polysiloxane layer has a thickness of 18 mm. In some embodiments, the polysiloxane layer has a thickness of 19 mm. In some embodiments, the polysiloxane layer has a thickness of 20 mm. In some embodiments, the polysiloxane layer has a thickness of 21 mm. In some embodiments, the polysiloxane layer has a thickness of 22 mm. In some embodiments, the polysiloxane layer has a thickness of 23 mm. In some embodiments, the polysiloxane layer has a thickness of 24 mm. In some embodiments, the polysiloxane layer has a thickness of 25 mm. In some embodiments, the polysiloxane layer has a thickness of 26 mm. In some embodiments, the polysiloxane layer has a thickness of 27 mm. In some embodiments, the polysiloxane layer has a thickness of 28 mm. In some embodiments, the polysiloxane layer has a thickness of 29 mm. In some embodiments, the polysiloxane layer has a thickness of 30 mm. In some embodiments, the polysiloxane layer has a thickness of 31 mm. In some embodiments, the polysiloxane layer has a thickness of 32 mm. In some embodiments, the polysiloxane layer has a thickness of 33 mm. In some embodiments, the polysiloxane layer has a thickness of 34 mm. In some embodiments, the polysiloxane layer has a thickness of 35 mm.

In some embodiments, the polysiloxane layer has a thickness of more than 10 mm. In some embodiments, the polysiloxane layer has a thickness of more than 11 mm. In some embodiments, the polysiloxane layer has a thickness of more than 12 mm. In some embodiments, the polysiloxane layer has a thickness of more than 13 mm. In some embodiments, the polysiloxane layer has a thickness of more than 14 mm. In some embodiments, the polysiloxane layer has a thickness of more than 15 mm. In some embodiments, the polysiloxane layer has a thickness of more than 16 mm. In some embodiments, the polysiloxane layer has a thickness of more than 17 mm. In some embodiments, the polysiloxane layer has a thickness of more than 18 mm. In some embodiments, the polysiloxane layer has a thickness of more than 19 mm. In some embodiments, the polysiloxane layer has a thickness of more than 20 mm. In some embodiments, the polysiloxane layer has a thickness of more than 21 mm. In some embodiments, the polysiloxane layer has a thickness of more than 22 mm. In some embodiments, the polysiloxane layer has a thickness of more than 23 mm. In some embodiments, the polysiloxane layer has a thickness of more than 24 mm. In some embodiments, the polysiloxane layer has a thickness of more than 25 mm. In some embodiments, the polysiloxane layer has a thickness of more than 26 mm. In some embodiments, the polysiloxane layer has a thickness of more than 27 mm. In some embodiments, the polysiloxane layer has a thickness of more than 28 mm. In some embodiments, the polysiloxane layer has a thickness of more than 29 mm. In some embodiments, the polysiloxane layer has a thickness of more than 30 mm. In some embodiments, the polysiloxane layer has a thickness of more than 31 mm. In some embodiments, the polysiloxane layer has a thickness of more than 32 mm. In some embodiments, the polysiloxane layer has a thickness of more than 33 mm. In some embodiments, the polysiloxane layer has a thickness of more than 34 mm. In some embodiments, the polysiloxane layer has a thickness of more than 35 mm.

In some embodiments, the polysiloxane layer has a thickness of less than 10 mm. In some embodiments, the polysiloxane layer has a thickness of less than 11 mm. In some embodiments, the polysiloxane layer has a thickness of less than 12 mm. In some embodiments, the polysiloxane layer has a thickness of less than 13 mm. In some embodiments, the polysiloxane layer has a thickness of less than 14 mm. In some embodiments, the polysiloxane layer has a thickness of less than 15 mm. In some embodiments, the polysiloxane layer has a thickness of less than 16 mm. In some embodiments, the polysiloxane layer has a thickness of less than 17 mm. In some embodiments, the polysiloxane layer has a thickness of less than 18 mm. In some embodiments, the polysiloxane layer has a thickness of less than 19 mm. In some embodiments, the polysiloxane layer has a thickness of less than 20 mm. In some embodiments, the polysiloxane layer has a thickness of less than 21 mm. In some embodiments, the polysiloxane layer has a thickness of less than 22 mm. In some embodiments, the polysiloxane layer has a thickness of less than 23 mm. In some embodiments, the polysiloxane layer has a thickness of less than 24 mm. In some embodiments, the polysiloxane layer has a thickness of less than 25 mm. In some embodiments, the polysiloxane layer has a thickness of less than 26 mm. In some embodiments, the polysiloxane layer has a thickness of less than 27 mm. In some embodiments, the polysiloxane layer has a thickness of less than 28 mm. In some embodiments, the polysiloxane layer has a thickness of less than 29 mm. In some embodiments, the polysiloxane layer has a thickness of less than 30 mm. In some embodiments, the polysiloxane layer has a thickness of less than 31 mm. In some embodiments, the polysiloxane layer has a thickness of less than 32 mm. In some embodiments, the polysiloxane layer has a thickness of less than 33 mm. In some embodiments, the polysiloxane layer has a thickness of less than 34 mm. In some embodiments, the polysiloxane layer has a thickness of less than 35 mm.

In some embodiments, the polysiloxane layer has a thickness of 10 to 35 mm. In some embodiments, the polysiloxane layer has a thickness of 10 to 15 mm.

In some embodiments, the roofing membrane includes a second layer comprising a metal having a conductivity, directly or indirectly contacting the polysiloxane layer, which is sufficient to reduce the static charge on the top surface of the polysiloxane layer. In some embodiments, the second layer at least partially covers the polysiloxane layer. In some embodiments, the second layer fully covers the polysiloxane layer. In some embodiments, the polysiloxane layer includes the antistatic additive in an amount that is sufficient to reduce the static charge on the top surface of the polysiloxane layer. In some embodiments, the polysiloxane layer includes an amount of the antistatic additive which is sufficient to reduce the static charge on the top surface of the polysiloxane layer, and the roofing membrane does not include the second layer. In some embodiments, the roofing membrane includes the second layer, directly or indirectly contacting the polysiloxane layer, which is sufficient to reduce the static charge on the top surface of the polysiloxane layer; and the polysiloxane layer includes an amount of the antistatic additive which is sufficient to reduce the static charge on the top surface of the polysiloxane layer. In some embodiments, the roofing membrane includes the second layer, directly or indirectly contacting the polysiloxane layer, and the polysiloxane layer includes the antistatic additive, and a combination of the second layer and an amount of the antistatic additive is sufficient to reduce the static charge on the top surface of the polysiloxane layer.

In some embodiments, a property, parameter, and/or characteristic of the second layer may reduce the static charge on the polysiloxane layer. In some embodiments, the second layer has one or more of the following: a sufficient thickness, a type of metal, a sufficient area of coverage of the second layer by the polysiloxane layer, and/or any combination thereof, so as to reduce the static charge on the polysiloxane layer.

In some embodiments, the second layer has a thickness of 20 mm. In some embodiments, the second layer has a thickness of 21 mm. In some embodiments, the second layer has a thickness of 22 mm. In some embodiments, the second layer has a thickness of 23 mm. In some embodiments, the second layer has a thickness of 24 mm. In some embodiments, the second layer has a thickness of 25 mm. In some embodiments, the second layer has a thickness of 26 mm. In some embodiments, the second layer has a thickness of 27 mm. In some embodiments, the second layer has a thickness of 28 mm. In some embodiments, the second layer has a thickness of 29 mm. In some embodiments, the second layer has a thickness of 30 mm. In some embodiments, the second layer has a thickness of 31 mm. In some embodiments, the second layer has a thickness of 32 mm. In some embodiments, the second layer has a thickness of 33 mm. In some embodiments, the second layer has a thickness of 34 mm. In some embodiments, the second layer has a thickness of 35 mm. In some embodiments, the second layer has a thickness of 36 mm. In some embodiments, the second layer has a thickness of 37 mm. In some embodiments, the second layer has a thickness of 38 mm. In some embodiments, the second layer has a thickness of 39 mm. In some embodiments, the second layer has a thickness of 40 mm. In some embodiments, the second layer has a thickness of 41 mm. In some embodiments, the second layer has a thickness of 42 mm. In some embodiments, the second layer has a thickness of 43 mm. In some embodiments, the second layer has a thickness of 44 mm. In some embodiments, the second layer has a thickness of 45 mm.

In some embodiments, the second layer has a thickness of more than 20 mm. In some embodiments, the second layer has a thickness of less than 20 mm. In some embodiments, the second layer has a thickness of 20 to 45 mm.

In some embodiments, the material of the second layer comprises a conductive material. In some embodiments, the conductive material comprises a conductive metal. In some embodiments, the conductive metal comprises one or more of copper, aluminum, silver, gold, iron steel, brass, and/or one or more other conductive metals, and/or combinations thereof.

In some embodiments, the second layer covers 5% of an area of a surface of the polysiloxane layer. In some embodiments, the second layer covers 10% of the area. In some embodiments, the second layer covers 15% of the area. In some embodiments, the second layer covers 20% of the area. In some embodiments, the second layer covers 25% of the area. In some embodiments, the second layer covers 30% of the area. In some embodiments, the second layer covers 35% of the area. In some embodiments, the second layer covers 40% of the area. In some embodiments, the second layer covers 45% of the area. In some embodiments, the second layer covers 50% of the area. In some embodiments, the second layer covers 55% of the area. In some embodiments, the second layer covers 60% of the area. In some embodiments, the second layer covers 65% of the area. In some embodiments, the second layer covers 70% of the area. In some embodiments, the second layer covers 75% of the area. In some embodiments, the second layer covers 80% of the area. In some embodiments, the second layer covers 85% of the area. In some embodiments, the second layer covers 90% of the area. In some embodiments, the second layer covers 95% of the area. In some embodiments, the second layer covers 99% of the area. In some embodiments, the second layer covers 100% of the area.

In some embodiments, the second layer covers more than 5% of the area. In some embodiments, the second layer covers more than 10% of the area. In some embodiments, the second layer covers more than 15% of the area. In some embodiments, the second layer covers more than 20% of the area. In some embodiments, the second layer covers more than 25% of the area. In some embodiments, the second layer covers more than 30% of the area. In some embodiments, the second layer covers more than 35% of the area. In some embodiments, the second layer covers more than 40% of the area. In some embodiments, the second layer covers more than 45% of the area. In some embodiments, the second layer covers more than 50% of the area. In some embodiments, the second layer covers more than 55% of the area. In some embodiments, the second layer covers more than 60% of the area. In some embodiments, the second layer covers more than 65% of the area. In some embodiments, the second layer covers more than 70% of the area. In some embodiments, the second layer covers more than 75% of the area. In some embodiments, the second layer covers more than 80% of the area. In some embodiments, the second layer covers more than 85% of the area. In some embodiments, the second layer covers more than 90% of the area. In some embodiments, the second layer covers more than 95% of the area. In some embodiments, the second layer covers more than 99% of the area.

In some embodiments, the second layer covers less than 5% of the area. In some embodiments, the second layer covers less than 10% of the area. In some embodiments, the second layer covers less than 15% of the area. In some embodiments, the second layer covers less than 20% of the area. In some embodiments, the second layer covers less than 25% of the area. In some embodiments, the second layer covers less than 30% of the area. In some embodiments, the second layer covers less than 35% of the area. In some embodiments, the second layer covers less than 40% of the area. In some embodiments, the second layer covers less than 45% of the area. In some embodiments, the second layer covers less than 50% of the area. In some embodiments, the second layer covers less than 55% of the area. In some embodiments, the second layer covers less than 60% of the area. In some embodiments, the second layer covers less than 65% of the area. In some embodiments, the second layer covers less than 70% of the area. In some embodiments, the second layer covers less than 75% of the area. In some embodiments, the second layer covers less than 80% of the area. In some embodiments, the second layer covers less than 85% of the area. In some embodiments, the second layer covers less than 90% of the area. In some embodiments, the second layer covers less than 95% of the area. In some embodiments, the second layer covers less than 99% of the area. In some embodiments, the second layer covers less than 100% of the area.

In some embodiments, the second layer comprises a film of the conductive material. In some embodiments, the film is formed by physical vapor deposition (PVD). In some embodiments, the film is formed by chemical vapor deposition (CVD). In some embodiments, the second layer comprises one or more wires of the conductive material. In some embodiments, the second layer comprises one or more strips of the conductive material.

In some embodiments, the second layer is the bottom or lowermost layer of the roofing membrane, which is in contact with or nearest to the roofing substrate when the roofing membrane is installed on or above the roofing substrate.

In some embodiments, the polysiloxane layer comprises the antistatic additive. In some embodiments, the antistatic additive is dispersed throughout the polysiloxane. In some embodiments, the antistatic additive is dispersed evenly though the polysiloxane. In some embodiments, the antistatic additive is dispersed unevenly though the polysiloxane.

In some embodiments, the antistatic additive includes polyethyleneimine. In some embodiments, the antistatic additive includes a fatty acid ester. In some embodiments, the fatty acid ester includes a monoglycerides fatty acid ester. In some embodiments, the fatty acid ester includes a diglycerides fatty acid ester. In some embodiments, the fatty acid ester includes a triglycerides fatty acid ester. In some embodiments, the fatty acid ester includes a vegetable oil. In some embodiments, the fatty acid ester includes coconut oil. In some embodiments, the fatty acid ester includes castor oil. In some embodiments, the fatty acid ester includes grapeseed oil. In some embodiments, the fatty acid ester includes avocado oil. In some embodiments, the fatty acid ester includes safflower oil. In some embodiments, the fatty acid ester includes peanut oil. In some embodiments, the fatty acid ester includes canola oil. In some embodiments, the fatty acid ester includes ethoxylated alkyl amine.

In some embodiments, the antistatic additive is 0.1 weight % based on a total weight of the polysiloxane layer. In some embodiments, the antistatic additive is 0.2 weight %. In some embodiments, the antistatic additive is 0.3 weight %. In some embodiments, the antistatic additive is 0.4 weight %. In some embodiments, the antistatic additive is 0.5 weight %. In some embodiments, the antistatic additive is 0.6 weight %. In some embodiments, the antistatic additive is 0.7 weight %. In some embodiments, the antistatic additive is 0.8 weight %. In some embodiments, the antistatic additive is 0.9 weight %. In some embodiments, the antistatic additive is 1.0 weight %. In some embodiments, the antistatic additive is 1.5 weight %. In some embodiments, the antistatic additive is 2.0 weight %. In some embodiments, the antistatic additive is 2.5 weight %. In some embodiments, the antistatic additive is 3.0 weight %. In some embodiments, the antistatic additive is 3.5 weight %. In some embodiments, the antistatic additive is 4.0 weight %. In some embodiments, the antistatic additive is 4.5 weight %. In some embodiments, the antistatic additive is 5.0 weight %. In some embodiments, the antistatic additive is 5.5 weight %. In some embodiments, the antistatic additive is 6.0 weight %. In some embodiments, the antistatic additive is 6.5 weight %. In some embodiments, the antistatic additive is 7.0 weight %. In some embodiments, the antistatic additive is 7.5 weight %. In some embodiments, the antistatic additive is 8.0 weight %. In some embodiments, the antistatic additive is 9.0 weight %. In some embodiments, the antistatic additive is 10 weight %. In some embodiments, the antistatic additive is 11 weight %. In some embodiments, the antistatic additive is 12 weight %. In some embodiments, the antistatic additive is 13 weight %. In some embodiments, the antistatic additive is 14 weight %. In some embodiments, the antistatic additive is 15 weight %.

In some embodiments, the antistatic additive is more than 0.1 weight %. In some embodiments, the antistatic additive is more than 0.2 weight %. In some embodiments, the antistatic additive is more than 0.3 weight %. In some embodiments, the antistatic additive is more than 0.4 weight %. In some embodiments, the antistatic additive is more than 0.5 weight %. In some embodiments, the antistatic additive is more than 0.6 weight %. In some embodiments, the antistatic additive is more than 0.7 weight %. In some embodiments, the antistatic additive is more than 0.8 weight %. In some embodiments, the antistatic additive is more than 0.9 weight %. In some embodiments, the antistatic additive is more than 1.0 weight %. In some embodiments, the antistatic additive is more than 1.5 weight %. In some embodiments, the antistatic additive is more than 2.0 weight %. In some embodiments, the antistatic additive is more than 2.5 weight %. In some embodiments, the antistatic additive is more than 3.0 weight %. In some embodiments, the antistatic additive is more than 3.5 weight %. In some embodiments, the antistatic additive is more than 4.0 weight %. In some embodiments, the antistatic additive is more than 4.5 weight %. In some embodiments, the antistatic additive is more than 5.0 weight %. In some embodiments, the antistatic additive is more than 5.5 weight %. In some embodiments, the antistatic additive is more than 6.0 weight %. In some embodiments, the antistatic additive is more than 6.5 weight %. In some embodiments, the antistatic additive is more than 7.0 weight %. In some embodiments, the antistatic additive is more than 7.5 weight %. In some embodiments, the antistatic additive is more than 8.0 weight %. In some embodiments, the antistatic additive is more than 9.0 weight %. In some embodiments, the antistatic additive is more than 10 weight %. In some embodiments, the antistatic additive is more than 11 weight %. In some embodiments, the antistatic additive is more than 12 weight %. In some embodiments, the antistatic additive is more than 13 weight %. In some embodiments, the antistatic additive is more than 14 weight %. In some embodiments, the antistatic additive is more than 15 weight %.

In some embodiments, the antistatic additive is less than 0.1 weight %. In some embodiments, the antistatic additive is less than 0.2 weight %. In some embodiments, the antistatic additive is less than 0.3 weight %. In some embodiments, the antistatic additive is less than 0.4 weight %. In some embodiments, the antistatic additive is less than 0.5 weight %. In some embodiments, the antistatic additive is less than 0.6 weight %. In some embodiments, the antistatic additive is less than 0.7 weight %. In some embodiments, the antistatic additive is less than 0.8 weight %. In some embodiments, the antistatic additive is less than 0.9 weight %. In some embodiments, the antistatic additive is less than 1.0 weight %. In some embodiments, the antistatic additive is less than 1.5 weight %. In some embodiments, the antistatic additive is less than 2.0 weight %. In some embodiments, the antistatic additive is less than 2.5 weight %. In some embodiments, the antistatic additive is less than 3.0 weight %. In some embodiments, the antistatic additive is less than 3.5 weight %. In some embodiments, the antistatic additive is less than 4.0 weight %. In some embodiments, the antistatic additive is less than 4.5 weight %. In some embodiments, the antistatic additive is less than 5.0 weight %. In some embodiments, the antistatic additive is less than 5.5 weight %. In some embodiments, the antistatic additive is less than 6.0 weight %. In some embodiments, the antistatic additive is less than 6.5 weight %. In some embodiments, the antistatic additive is less than 7.0 weight %. In some embodiments, the antistatic additive is less than 7.5 weight %. In some embodiments, the antistatic additive is less than 8.0 weight %. In some embodiments, the antistatic additive is less than 9.0 weight %. In some embodiments, the antistatic additive is less than 10 weight %. In some embodiments, the antistatic additive is less than 11 weight %. In some embodiments, the antistatic additive is less than 12 weight %. In some embodiments, the antistatic additive is less than 13 weight %. In some embodiments, the antistatic additive is less than 14 weight %. In some embodiments, the antistatic additive is less than 15 weight %.

In some embodiments, the antistatic additive is 0.1 to 15 weight %. In some embodiments, the antistatic additive is 0.2 to 15 weight %. In some embodiments, the antistatic additive is 0.3 to 15 weight %. In some embodiments, the antistatic additive is 0.4 to 15 weight %. In some embodiments, the antistatic additive is 0.5 to 15 weight %. In some embodiments, the antistatic additive is 0.6 to 15 weight %. In some embodiments, the antistatic additive is 0.7 to 15 weight %. In some embodiments, the antistatic additive is 0.8 to 15 weight %. In some embodiments, the antistatic additive is 0.9 to 15 weight %. In some embodiments, the antistatic additive is 1.0 to 15 weight %. In some embodiments, the antistatic additive is 1.5 to 15 weight %. In some embodiments, the antistatic additive is 2.0 to 15 weight %. In some embodiments, the antistatic additive is 2.5 to 15 weight %. In some embodiments, the antistatic additive is 3.0 to 15 weight %. In some embodiments, the antistatic additive is 3.5 to 15 weight %. In some embodiments, the antistatic additive is 4.0 to 15 weight %. In some embodiments, the antistatic additive is 4.5 to 15 weight %. In some embodiments, the antistatic additive is 5.0 to 15 weight %. In some embodiments, the antistatic additive is 5.5 to 15 weight %. In some embodiments, the antistatic additive is 6.0 to 15 weight %. In some embodiments, the antistatic additive is 6.5 to 15 weight %. In some embodiments, the antistatic additive is 7.0 to 15 weight %. In some embodiments, the antistatic additive is 7.5 to 15 weight %. In some embodiments, the antistatic additive is 8.0 to 15 weight %. In some embodiments, the antistatic additive is 9.0 to 15 weight %. In some embodiments, the antistatic additive is 10 to 15 weight %. In some embodiments, the antistatic additive is 11 to 15 weight %. In some embodiments, the antistatic additive is 12 to 15 weight %. In some embodiments, the antistatic additive is 13 to 15 weight %. In some embodiments, the antistatic additive is 14 to 15 weight %.

In some embodiments, the polysiloxane layer directly contacts the second layer of the roofing membrane, such that there is no intervening layer between the polysiloxane layer and the second layer. In some embodiments, the polysiloxane layer indirectly contacts the second layer of the roofing membrane, such as through one or more intermediate layers between the polysiloxane layer and the second layer.

In some embodiments, the one or more intermediate layers of the roofing membrane comprise a single layer. In some embodiments, the one or more intermediate layers of the roofing membrane comprise more than one layer. In some embodiments, the one or more intermediate layers of the roofing membrane comprise two layers. In some embodiments, the one or more intermediate layers of the roofing membrane comprise three layers. In some embodiments, the one or more intermediate layers of the roofing membrane comprise four layer. In some embodiments, the one or more intermediate layers of the roofing membrane comprise five layers. In some embodiments, the one or more intermediate layers of the roofing membrane comprise more than five layers.

In some embodiments, the one or more intermediate layers of the roofing membrane comprise one layer, which comprises a porous layer. In some embodiments, the porous layer comprises a plurality of pores. In some embodiments, the porous layer comprises one or more of a woven material, non-woven material, mesh material, and/or combinations thereof, which comprises the plurality of pores. In some embodiments, the material comprises one or more of polymer, polyethylene, polyester, polypropylene, fiber glass, nylon, and/or one or more other materials, and/or combinations thereof.

In some embodiments, the pores of the porous layer are embedded with a conductive material. In some embodiments, the conductive material comprises a conductive metal. In some embodiments, the conductive metal comprises one or more of copper, aluminum, silver, gold, iron, steel, or brass, and/or one or more other conductive metals, and/or combinations thereof. In some embodiments, the pores of the porous layer are embedded with polysiloxane. In some embodiments, the pores of the porous layer are embedded with polysiloxane and the conductive metal. In some embodiments, either or both of the polysiloxane layer and/or the polysiloxane embedded in the pores of the porous layer comprises the antistatic additive.

In some embodiments, the porous layer has a thickness of 10 mm. In some embodiments, the porous layer has a thickness of 11 mm. In some embodiments, the porous layer has a thickness of 12 mm. In some embodiments, the porous layer has a thickness of 13 mm. In some embodiments, the porous layer has a thickness of 14 mm. In some embodiments, the porous layer has a thickness of 15 mm. In some embodiments, the porous layer has a thickness of 16 mm. In some embodiments, the porous layer has a thickness of 17 mm. In some embodiments, the porous layer has a thickness of 18 mm. In some embodiments, the porous layer has a thickness of 19 mm. In some embodiments, the porous layer has a thickness of 20 mm. In some embodiments, the porous layer has a thickness of 21 mm. In some embodiments, the porous layer has a thickness of 22 mm. In some embodiments, the porous layer has a thickness of 23 mm. In some embodiments, the porous layer has a thickness of 24 mm. In some embodiments, the porous layer has a thickness of 25 mm.

In some embodiments, the porous layer has a thickness of more than 10 mm. In some embodiments, the porous layer has a thickness of more than 11 mm. In some embodiments, the porous layer has a thickness of more than 12 mm. In some embodiments, the porous layer has a thickness of more than 13 mm. In some embodiments, the porous layer has a thickness of more than 14 mm. In some embodiments, the porous layer has a thickness of more than 15 mm. In some embodiments, the porous layer has a thickness of more than 16 mm. In some embodiments, the porous layer has a thickness of more than 17 mm. In some embodiments, the porous layer has a thickness of more than 18 mm. In some embodiments, the porous layer has a thickness of more than 19 mm. In some embodiments, the porous layer has a thickness of more than 20 mm. In some embodiments, the porous layer has a thickness of more than 21 mm. In some embodiments, the porous layer has a thickness of more than 22 mm. In some embodiments, the porous layer has a thickness of more than 23 mm. In some embodiments, the porous layer has a thickness of more than 24 mm. In some embodiments, the porous layer has a thickness of more than 25 mm.

In some embodiments, the porous layer has a thickness of less than 10 mm. In some embodiments, the porous layer has a thickness of less than 11 mm. In some embodiments, the porous layer has a thickness of less than 12 mm. In some embodiments, the porous layer has a thickness of less than 13 mm. In some embodiments, the porous layer has a thickness of less than 14 mm. In some embodiments, the porous layer has a thickness of less than 15 mm. In some embodiments, the porous layer has a thickness of less than 16 mm. In some embodiments, the porous layer has a thickness of less than 17 mm. In some embodiments, the porous layer has a thickness of less than 18 mm. In some embodiments, the porous layer has a thickness of less than 19 mm. In some embodiments, the porous layer has a thickness of less than 20 mm. In some embodiments, the porous layer has a thickness of less than 21 mm. In some embodiments, the porous layer has a thickness of less than 22 mm. In some embodiments, the porous layer has a thickness of less than 23 mm. In some embodiments, the porous layer has a thickness of less than 24 mm. In some embodiments, the porous layer has a thickness of less than 25 mm.

In some embodiments, the porous layer has a thickness of 10 to 25 mm.

In some embodiments, the second layer covers a percentage of an area of the porous layer rather than the percentage of the area of the polysiloxane layer, because the porous layer is between the polysiloxane layer and the second layer. Thus, in some embodiments, the second layer covers the porous layer the percentages described with reference to the polysiloxane layer.

In some embodiments, the roofing membrane includes a reinforcement layer. In some embodiments, the reinforcement layer is the bottom or lowermost layer of the roofing membrane, which is in contact with or nearest to the roofing substrate when the roofing membrane is installed on or above the roofing substrate. In some embodiments, the reinforcement layer comprises one or more of a woven material, non-woven material, mesh material, and/or combinations thereof. In some embodiments, the material comprises one or more of polymer, polyethylene, polyester, polypropylene, fiber glass, nylon, and/or one or more other materials, and/or combinations thereof.

In some embodiments, the reinforcement layer has a thickness of 10 mm. In some embodiments, the reinforcement layer has a thickness of 11 mm. In some embodiments, the reinforcement layer has a thickness of 12 mm. In some embodiments, the reinforcement layer has a thickness of 13 mm. In some embodiments, the reinforcement layer has a thickness of 14 mm. In some embodiments, the reinforcement layer has a thickness of 15 mm. In some embodiments, the reinforcement layer has a thickness of 16 mm. In some embodiments, the reinforcement layer has a thickness of 17 mm. In some embodiments, the reinforcement layer has a thickness of 18 mm. In some embodiments, the reinforcement layer has a thickness of 19 mm. In some embodiments, the reinforcement layer has a thickness of 20 mm. In some embodiments, the reinforcement layer has a thickness of 21 mm. In some embodiments, the reinforcement layer has a thickness of 22 mm. In some embodiments, the reinforcement layer has a thickness of 23 mm. In some embodiments, the reinforcement layer has a thickness of 24 mm. In some embodiments, the reinforcement layer has a thickness of 25 mm.

In some embodiments, the reinforcement layer has a thickness of more than 10 mm. In some embodiments, the reinforcement layer has a thickness of more than 11 mm. In some embodiments, the reinforcement layer has a thickness of more than 12 mm. In some embodiments, the reinforcement layer has a thickness of more than 13 mm. In some embodiments, the reinforcement layer has a thickness of more than 14 mm. In some embodiments, the reinforcement layer has a thickness of more than 15 mm. In some embodiments, the reinforcement layer has a thickness of more than 16 mm. In some embodiments, the reinforcement layer has a thickness of more than 17 mm. In some embodiments, the reinforcement layer has a thickness of more than 18 mm. In some embodiments, the reinforcement layer has a thickness of more than 19 mm. In some embodiments, the reinforcement layer has a thickness of more than 20 mm. In some embodiments, the reinforcement layer has a thickness of more than 21 mm. In some embodiments, the reinforcement layer has a thickness of more than 22 mm. In some embodiments, the reinforcement layer has a thickness of more than 23 mm. In some embodiments, the reinforcement layer has a thickness of more than 24 mm. In some embodiments, the reinforcement layer has a thickness of more than 25 mm.

In some embodiments, the reinforcement layer has a thickness of less than 10 mm. In some embodiments, the reinforcement layer has a thickness of less than 11 mm. In some embodiments, the reinforcement layer has a thickness of less than 12 mm. In some embodiments, the reinforcement layer has a thickness of less than 13 mm. In some embodiments, the reinforcement layer has a thickness of less than 14 mm. In some embodiments, the reinforcement layer has a thickness of less than 15 mm. In some embodiments, the reinforcement layer has a thickness of less than 16 mm. In some embodiments, the reinforcement layer has a thickness of less than 17 mm. In some embodiments, the reinforcement layer has a thickness of less than 18 mm. In some embodiments, the reinforcement layer has a thickness of less than 19 mm. In some embodiments, the reinforcement layer has a thickness of less than 20 mm. In some embodiments, the reinforcement layer has a thickness of less than 21 mm. In some embodiments, the reinforcement layer has a thickness of less than 22 mm. In some embodiments, the reinforcement layer has a thickness of less than 23 mm. In some embodiments, the reinforcement layer has a thickness of less than 24 mm. In some embodiments, the reinforcement layer has a thickness of less than 25 mm.

In some embodiments, the reinforcement layer has a thickness of 10 to 25 mm.

In some embodiments, the roofing membrane omits the reinforcement layer.

In some embodiments, the roofing membrane includes one or more polymer layers. In some embodiments, the polymer layer is between the second layer and the reinforcement layer. In some embodiments, the reinforcement layer is the bottom or lowermost layer of the roofing membrane, which is in contact with or nearest to the roofing substrate when the roofing membrane is installed on or above the roofing substrate. In some embodiments, the roofing membrane includes the polymer layer on and/or between one or more other layers of the roofing membrane. In some embodiments, the roofing membrane includes two polymer layers, such as the polymer layer between the second layer and the reinforcement layer, and the polymer layer that is the bottom or lowermost layer of the roofing membrane, which is in contact with or nearest to the roofing substrate when the roofing membrane is installed on or above the roofing substrate. In some embodiments, the roofing membrane that includes one or more polymer films includes the porous layer between the polysiloxane layer and the second layer. In some embodiments, the roofing membrane that includes one or more polymer films includes the polysiloxane layer that directly contacts the second layer.

In some embodiments, the roofing membrane includes one or more polymer layers, and omits one or more of the second layer, the porous layer, and/or the reinforcement layer.

In some embodiments, the polymer layer comprises one or more of polyethylene, polyester, polypropylene, and/or one or more other polymers, and/or combinations thereof.

In some embodiments, the polymer layer has a thickness of 10 mm. In some embodiments, the polymer layer has a thickness of 11 mm. In some embodiments, the polymer layer has a thickness of 12 mm. In some embodiments, the polymer layer has a thickness of 13 mm. In some embodiments, the polymer layer has a thickness of 14 mm. In some embodiments, the polymer layer has a thickness of 15 mm. In some embodiments, the polymer layer has a thickness of 16 mm. In some embodiments, the polymer layer has a thickness of 17 mm. In some embodiments, the polymer layer has a thickness of 18 mm. In some embodiments, the polymer layer has a thickness of 19 mm. In some embodiments, the polymer layer has a thickness of 20 mm. In some embodiments, the polymer layer has a thickness of 21 mm. In some embodiments, the polymer layer has a thickness of 22 mm. In some embodiments, the polymer layer has a thickness of 23 mm. In some embodiments, the polymer layer has a thickness of 24 mm. In some embodiments, the polymer layer has a thickness of 25 mm.

In some embodiments, the polymer layer has a thickness of more than 10 mm. In some embodiments, the polymer layer has a thickness of more than 11 mm. In some embodiments, the polymer layer has a thickness of more than 12 mm. In some embodiments, the polymer layer has a thickness of more than 13 mm. In some embodiments, the polymer layer has a thickness of more than 14 mm. In some embodiments, the polymer layer has a thickness of more than 15 mm. In some embodiments, the polymer layer has a thickness of more than 16 mm. In some embodiments, the polymer layer has a thickness of more than 17 mm. In some embodiments, the polymer layer has a thickness of more than 18 mm. In some embodiments, the polymer layer has a thickness of more than 19 mm. In some embodiments, the polymer layer has a thickness of more than 20 mm. In some embodiments, the polymer layer has a thickness of more than 21 mm. In some embodiments, the polymer layer has a thickness of more than 22 mm. In some embodiments, the polymer layer has a thickness of more than 23 mm. In some embodiments, the polymer layer has a thickness of more than 24 mm. In some embodiments, the polymer layer has a thickness of more than 25 mm.

In some embodiments, the polymer layer has a thickness of less than 10 mm. In some embodiments, the polymer layer has a thickness of less than 11 mm. In some embodiments, the polymer layer has a thickness of less than 12 mm. In some embodiments, the polymer layer has a thickness of less than 13 mm. In some embodiments, the polymer layer has a thickness of less than 14 mm. In some embodiments, the polymer layer has a thickness of less than 15 mm. In some embodiments, the polymer layer has a thickness of less than 16 mm. In some embodiments, the polymer layer has a thickness of less than 17 mm. In some embodiments, the polymer layer has a thickness of less than 18 mm. In some embodiments, the polymer layer has a thickness of less than 19 mm. In some embodiments, the polymer layer has a thickness of less than 20 mm. In some embodiments, the polymer layer has a thickness of less than 21 mm. In some embodiments, the polymer layer has a thickness of less than 22 mm. In some embodiments, the polymer layer has a thickness of less than 23 mm. In some embodiments, the polymer layer has a thickness of less than 24 mm. In some embodiments, the polymer layer has a thickness of less than 25 mm.

In some embodiments, the polymer layer has a thickness of 10 to 25 mm.

In some embodiments, the roofing membrane omits the polymer layer.

In some embodiments, the second layer and/or the antistatic additive is sufficient to reduce the static charge on the top surface of the top layer, such as the top surface of the polysiloxane layer, as compared to a control roofing membrane without the second layer and/or the antistatic additive. As used herein, the term "control roofing membrane" is a membrane similarly constructed to the disclosed roofing membrane while omitting an antistatic additive from the polysiloxane layer, the second layer, and/or the porous layer, and/or while omitting a second layer.

In some embodiments, a sufficient thickness and/or a sufficient metal conductivity and/or a sufficient area of the second layer is selected to result in a desired reduction of a static charge on a surface of the first layer as compared to a control roofing membrane, wherein the control roofing membrane is identical to the roofing membrane except for the second layer—i.e. the control does not have a second layer having a conductivity.

In some embodiments, the static charge is reduced by 5% relative to the control roofing membrane. In some embodiments, the static charge is reduced by 10%. In some embodiments, the static charge is reduced by 15%. In some embodiments, the static charge is reduced by 20%. In some embodiments, the static charge is reduced by 25%. In some embodiments, the static charge is reduced by 30%. In some embodiments, the static charge is reduced by 35%. In some embodiments, the static charge is reduced by 40%. In some embodiments, the static charge is reduced by 45%. In some embodiments, the static charge is reduced by 50%. In some embodiments, the static charge is reduced by 60%. In some embodiments, the static charge is reduced by 70%. In some embodiments, the static charge is reduced by 80%. In some embodiments, the static charge is reduced by 90%. In some embodiments, the static charge is reduced by 95%. In some embodiments, the static charge is reduced by 99%. In some embodiments, the static charge is reduced by 100%.

In some embodiments, the static charge is reduced by more than 5%. In some embodiments, the static charge is reduced by more than 10%. In some embodiments, the static charge is reduced by more than 15%. In some embodiments, the static charge is reduced by more than 20%. In some embodiments, the static charge is reduced by more than 25%. In some embodiments, the static charge is reduced by more than 30%. In some embodiments, the static charge is reduced by more than 35%. In some embodiments, the static charge is reduced by more than 40%. In some embodiments, the static charge is reduced by more than 45%. In some embodiments, the static charge is reduced by more than 50%. In some embodiments, the static charge is reduced by more than 60%. In some embodiments, the static charge is reduced by more than 70%. In some embodiments, the static charge is reduced by more than 80%. In some embodiments, the static charge is reduced by more than 90%. In some embodiments, the static charge is reduced by more than 95%. In some embodiments, the static charge is reduced by more than 99%.

In some embodiments, the static charge is reduced by less than 5%. In some embodiments, the static charge is reduced by less than 10%. In some embodiments, the static charge is reduced by less than 15%. In some embodiments, the static charge is reduced by less than 20%. In some embodiments, the static charge is reduced by less than 25%. In some embodiments, the static charge is reduced by less than 30%. In some embodiments, the static charge is reduced by less than 35%. In some embodiments, the static charge is reduced by less than 40%. In some embodiments, the static charge is reduced by less than 45%. In some embodiments, the static charge is reduced by less than 50%. In some embodiments, the static charge is reduced by less than 60%. In some embodiments, the static charge is reduced by less than 70%. In some embodiments, the static charge is reduced by less than 80%. In some embodiments, the static charge is reduced by less than 90%. In some embodiments, the static charge is reduced by less than 95%. In some embodiments, the static charge is reduced by less than 99%. In some embodiments, the static charge is reduced by less than 100%.

In some embodiments, the roofing membrane does not include an antistatic additive, and/or does not include a second layer. In some embodiments, the roofing membrane includes both an antistatic additive and a second layer. In some embodiments, the roofing membrane includes either an antistatic additive or a second layer In some embodiments, the roofing membrane is installed above a separate membrane with a second layer.

In some embodiments, one or more intervening membranes may be installed between the roofing substrate and the roofing membrane that includes the polysiloxane layer with the antistatic additive and/or the second layer.

In some embodiments, the roofing membrane comprises a layer that is an adhesive, such as but not limited to a pressure-sensitive adhesive, for adhering the roofing membrane to the roofing substrate and/or to another layer or membrane above the roofing substate, during installation. In some embodiments, the roofing membrane comprises a layer that is a removable release liner, which when removed exposes the adhesive, so that the roofing membrane may be adhered to the roofing substrate and/or to another layer or membrane above the roofing substrate.

Figure 1:
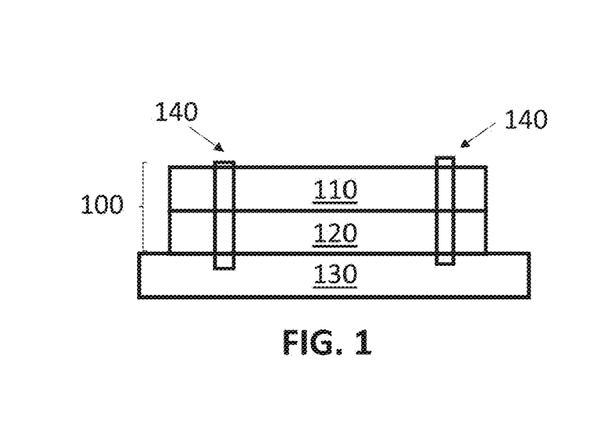
FIG. 1 is a cross-sectional view of a roofing system, in accordance with some embodiments of the invention.

With reference to the figures, the figures show some embodiments of the present invention. FIG. 1 is a cross-sectional view of a roofing system, in accordance with some embodiments of the invention. As shown in the figure, in some embodiments, a roofing membrane 100 includes a first layer 110, and a second layer 120. In some embodiments, either or both of the first layer 110 and/or the second layer 120 may be as described above. Also as described, in some embodiments, the first layer 110 may be the top or uppermost layer of the roofing membrane 100 when the roofing membrane 100 is installed on a roofing substrate 130 in a roofing system, and the second layer 120 may be a bottom or lowermost layer of the roofing membrane 100, which is in contact with or nearest the roofing substrate 130. As discussed, in some embodiments, the roofing membrane 100 may be installed on or above the roofing substrate 130 by mechanical fasteners 140, such as staples, screws, nails, or rivets; or may be adhered to the roofing substrate 130 with an adhesive (not shown) that is applied to the roofing substrate 130 and/or to the roofing membrane 100.

Figures 2, 5:
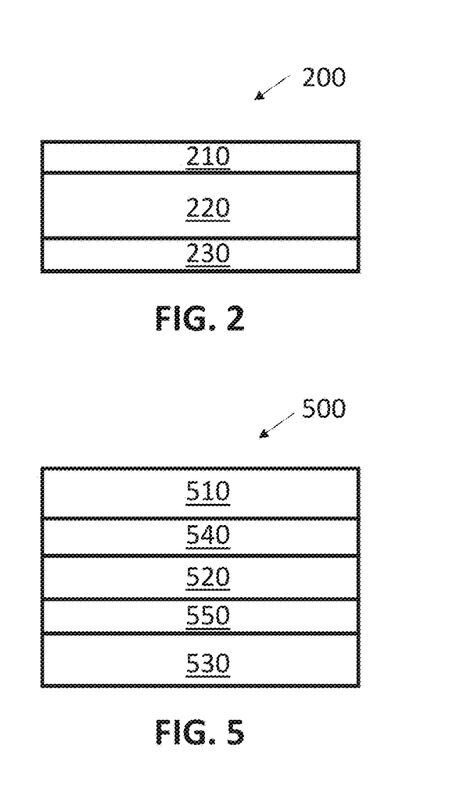
FIG. 2 is a cross-sectional view of a roofing membrane, in accordance with some embodiments of the invention.
FIG. 5 is a cross-sectional view of a roofing membrane, in accordance with some embodiments of the invention.

FIG. 2 is a cross-sectional view of a roofing membrane, in accordance with some embodiments of the invention. As shown in the figure, in some embodiments, a roofing membrane 200 may include the first layer 210, the second layer 220, and a reinforcement layer 230. In some embodiments, one or more, or all, of the first layer 210, the second layer 220, and/or the reinforcement layer 230 may be as described above. Also as described, in some embodiments, the first layer 210 may be the top or uppermost layer of the roofing membrane 200 when installed on the roofing substrate in the roofing system, and the reinforcement layer 230 may be the bottom or lowermost layer of the roofing membrane 200, which is in contact with or near the roofing substrate. As the figure shows, in some embodiments, the second layer 220 may be between the first layer 210 and the reinforcement layer 230. As discussed, in some embodiments, the roofing membrane 200 may be installed on or above the roofing substrate by mechanical fasteners, such as staples, screws, nails, or rivets; or may be adhered to the roofing substrate with an adhesive that is applied to the roofing substrate and/or the roofing membrane 200.

Figure 3:
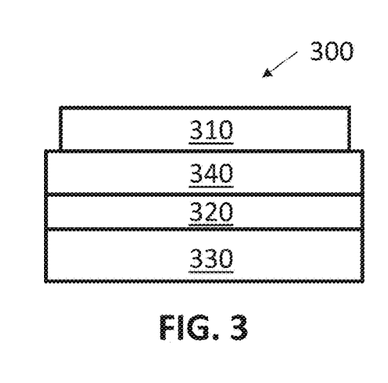
FIG. 3 is a cross-sectional view of a roofing membrane, in accordance with some embodiments of the invention.

FIG. 3 is a cross-sectional view of a roofing membrane, in accordance with some embodiments of the invention. As shown in the figure, in some embodiments, a roofing membrane 300 may include the first layer 310, the second layer 320, the reinforcement layer 330, and a fourth layer—porous layer 340. In some embodiments, one or more, or all, of the first layer 310, the second layer 320, the reinforcement layer 330, and/or the porous layer 340 may be as described above. Also as described, in some embodiments, the first layer 310 may be the top or uppermost layer of the roofing membrane 300 when installed on the roofing substrate in the roofing system, and the reinforcement layer 330 may be the bottom or lowermost layer of the roofing membrane 300, which is in contact with or near the roofing substrate. As shown, in some embodiments, the porous layer 340 may be between the first layer 310 and the second layer 320. In some embodiments, as discussed, pores of the porous layer 330 may be embedded with first layer and/or another conductive material. As discussed, in some embodiments, the roofing membrane 300 may be installed on or above the roofing substrate by mechanical fasteners, such as staples, screws, nails, or rivets; or may be adhered to the roofing substrate with an adhesive that is applied to the roofing substrate and/or the roofing membrane 300.

Figure 4:
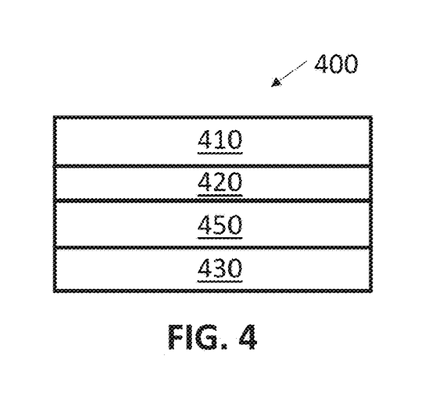
FIG. 4 is a cross-sectional view of a roofing membrane, in accordance with some embodiments of the invention.

FIG. 4 is a cross-sectional view of a roofing membrane, in accordance with some embodiments of the invention. As shown in the figure, in some embodiments, a roofing membrane 400 may include the first layer 410, the second layer 420, the reinforcement layer 430, and a polymer layer 450. In some embodiments, one or more, or all, of the first layer 410, the second layer 420, the reinforcement layer 430, and/or the polymer layer 450 may be as described above. Also as described, in some embodiments, the first layer 410 may be the top or uppermost layer of the roofing membrane 400 when installed on the roofing substrate in the roofing system, and the reinforcement layer 430 may be the bottom or lowermost layer of the roofing membrane 400, which is in contact with or near the roofing substrate. As shown, in some embodiments, the polymer layer 450 may be between the second layer 420 and the reinforcement layer 430. As discussed, in some embodiments, the roofing membrane 400 may be installed on or above the roofing substrate by mechanical fasteners, such as staples, screws, nails, or rivets; or may be adhered to the roofing substrate with an adhesive that is applied to the roofing substrate and/or the roofing membrane 400.

In some embodiments, as also discussed, the polymer layer 450 may be the bottom or lowermost layer of the roofing membrane 400, which is in contact with or near the roofing substrate in the roofing system. For example, in some embodiments, the roofing membrane 400 omits the reinforcement layer 430. In some embodiments, the roofing membrane 400 may include two polymer membranes 450—one polymer layer 450 between the second layer 4420 and the reinforcement layer 430, and the other polymer layer 450 as the bottom or lowermost layer of the roofing membrane 400.

FIG. 5 is a cross-sectional view of a roofing membrane, in accordance with some embodiments of the invention. As shown in the figure, in some embodiments, a roofing membrane 500 may include the first layer 510, the second layer 520, the reinforcement layer 530, the porous layer 540, and the polymer layer 550. In some embodiments, one or more, or all, of the first layer 510, the second layer 520, the reinforcement layer 530, the porous layer 540, and/or the polymer layer 550 may be as described above. Also as described, in some embodiments, the first layer 510 may be the top or uppermost layer of the roofing membrane 500 when installed on the roofing substrate in the roofing system, and the reinforcement layer 530 may be the bottom or lowermost layer of the roofing membrane 500, which is in contact with or near the roofing substrate. As shown, in some embodiments, the porous layer 540 may be between the first layer 510 and the second layer 520, and the polymer layer 550 may be between the second layer 520 and the reinforcement layer 530. As discussed, in some embodiments, the roofing membrane 500 may be installed on or above the roofing substrate by mechanical fasteners, such as staples, screws, nails, or rivets; or may be adhered to the roofing substrate with an adhesive that is applied to the roofing substrate and/or the roofing membrane 500.

In some embodiments, the polymer layer 550 may be the bottom or lowermost layer of the roofing membrane 500, which is in contact with or near the roofing substrate in the roofing system. In some embodiments, the roofing membrane 500 may include two polymer membranes 550—one polymer layer 550 between the second layer 520 and the reinforcement layer 530, and the other polymer layer 550 as the bottom or lowermost layer of the roofing membrane 500.

As discussed above, in some embodiments, the first layer 510 may include first, and an antistatic additive dispersed throughout the first. Thus, for example, the membrane in any of the roofing membranes 100, 200, 300, 400, and/or 500 may include the antistatic additive, in addition to the second layer, and/or the porous layer.

Also as discussed above, in some embodiments, when the first layer includes the antistatic additive dispersed throughout the first, the roofing membrane may omit the second layer. Further, in some embodiments, when the first layer includes the antistatic additive dispersed throughout the first, the roofing membrane may omit the second layer and the porous layer. Thus, for example, some embodiments of the present invention include any of the above-discussed and illustrated roofing membranes, and/or the above-discussed variations thereof, in which the first layer includes the antistatic additive, and the roofing membrane omits the second layer and/or the porous layer. By way of further example, any of the roofing membranes 100, 200, 300, 400, and/or 500 may omit the second layer, and/or may omit the second layer and the porous layer.

Figure 6:
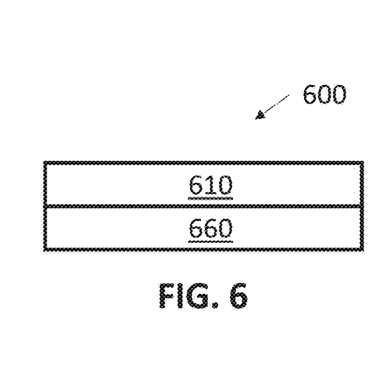
FIG. 6 is a cross-sectional view of a roofing membrane, in accordance with some embodiments of the invention.

FIG. 6 is a cross-sectional view of roofing membrane, in accordance with some embodiments of the invention. In accordance with some embodiments, a roofing membrane 600 may include the first layer 610 with the antistatic additive dispersed throughout the first, and a substrate layer 660. In some embodiments, either or both of the first layer 610 and/or the substrate 660 may be as described above. Also as discussed above, in some embodiments, the substrate layer 660 may include one or more of any of the previously-described and/or illustrated layers—such as, for example, one or more of the reinforcement layer and/or the polymer layer—and/or one or more other layers.

As described, in some embodiments, the first layer 610 may be the top or uppermost layer of the roofing membrane 600 when installed on the roofing substrate in the roofing system, and the substrate layer 660 may be the bottom or lowermost layer of the roofing membrane 600, which is in contact with or near the roofing substrate. As discussed, in some embodiments, the roofing membrane 600 may be installed on or above the roofing substrate by mechanical fasteners, such as staples, screws, nails, or rivets; or may be adhered to the roofing substrate with an adhesive that is applied to the roofing substrate and/or the roofing membrane 600

As discussed above, in some embodiments of the invention, the roofing membrane may be installed by an adhesive, such as but not limited to a pressure-sensitive adhesive, which is a layer of the roofing membrane. In some embodiments, also as discussed, a removable release liner may cover the adhesive, such that removal of the release liner exposes the adhesive for installation of the roofing membrane on or above the roofing substrate in the roofing system.

In some embodiments of the invention, any of the shown and described roofing membranes, and any of the above-discussed variations, may be provided in the form or a roll, in the form of a sheet, or in another form. Further, it is to be understood that the present invention includes a roofing membrane including any of the layers of any of the disclosed and described roofing membranes.

Comparative Data

Table 1 includes test data regarding measured static charges on a roofing membrane including a first layer and a second layer in accordance with some embodiments of the invention, and on a control roofing membrane with the first layer and without a second layer. Both membranes were manufactured with the same first formulation, and include a first layer that is 20 mm in thickness. The roofing membrane in accordance with some embodiments of the invention includes a first layer that is 20 mm in thickness, and an aluminum layer of 33.5 mm in thickness, and covering substantially all of a bottom surface of the first layer.

The table shows measured initial static charge values and static charge values after an attempt to statically charge a top surface of the first layer, on each of the roofing membranes. Static charges were measured on the top surfaces of the first layers, with a Newhai Upgraded Electrostatic Field Meter 0-22 KV Handheld Electrostatic Tester.

TABLE 1

| Roofing Membrane Type | Initial Static Charge (KV) | Subsequent Static Charge (kV) |
|---|---|---|
| Control Roofing Membrane | −10 | −10 |
| Roofing Membrane with Second layer | 0 | −0.7 |

Table 2 includes data regarding measured static charges on roofing membranes including antistatic additives dispersed through the first layer in accordance with some embodiments of the invention, and on a control roofing membrane with the first layer and without any antistatic additive. Other than the indicated antistatic additive, all of the roofing membranes were manufactured with the same polysiloxane formulation, and all of the roofing membranes are 20 mm in thickness. The roofing membranes including antistatic additives dispersed through the first layer include the indicated percentages of antistatic agent, and the indicated percentages are weight percentages (weight %) based on the total weight of the first layer.

The table shows initial static charge values and static charge values after an attempt to statically charge a top surface of the first layer of each of the roofing membranes.

TABLE 2

| Roofing Membrane Type | Initial Static Charge (kV) | Subsequent Static Charge (kV) |
|---|---|---|
| Control Roofing Membrane | −10 | −10 |
| Roofing Membrane with 0.5% polymethylsilsesquioxane | −0.8 | −10.3 |
| Roofing Membrane with 1% polymethylsilsesquioxane | 0 | −3.4 |
| Roofing Membrane with 1% fatty acid ester | −0.9 | −0.5 |
| Roofing Membrane with 3% fatty acid ester | −0.05 | −0.9 |
| Roofing membrane with 1% ethoxylated alkyl amine fatty acid ester | −0.1 | −3.1 |
| Roofing membrane with 3% ethoxylated alkyl amine fatty acid ester | 0 | −2.7 |
| Roofing membrane with 1% polyethyleneimine | 0 | −2.5 |

Table 3 includes data regarding measured static charges on roofing membranes including both antistatic additives dispersed through the first layer as well as a second layer in accordance with some embodiments of the invention, and on a control roofing membrane with the first layer but without any antistatic additive and without a second layer. Other than the indicated antistatic additive, all of the roofing membranes were manufactured with the same polysiloxane formulation, and all of the roofing membranes are 20 mm in thickness. The roofing membranes in accordance with some embodiments of the invention each include an aluminum layer of 33.5 mm in thickness, covering substantially all of a bottom surface of the first layer. The roofing membranes including antistatic additives dispersed through the first layer include the indicated percentages of antistatic agent, and the indicated percentages are weight percentages (weight %) based on the total weight of the first layer.

The table shows initial static charge values and static charge values after an attempt to statically charge a top surface of the first layer of each of the roofing membranes.

TABLE 3

| Roofing Membrane Type | Initial Static Charge (kV) | Subsequent Static Charge (kV) |
|---|---|---|
| Control Roofing Membrane | −10 | −10 |
| Roofing Membrane with 0.5% polymethylsilsesquioxane and Second layer | 0 | −1.4 |
| Roofing Membrane with 1% polymethylsilsesquioxane and Second layer | 0 | −0.1 |
| Roofing Membrane with 1% fatty acid ester and Second layer | 0 | −0.1 |
| Roofing Membrane with 3% fatty acid ester and Second layer | 0 | −0.4 |
| Roofing membrane with 1% ethoxylated alkyl amine fatty acid ester and Second layer | 0 | −0.1 |
| Roofing membrane with 3% ethoxylated alkyl amine fatty acid ester and Second layer | 0 | 0 |
| Roofing membrane with 1% polyethyleneimine and Second layer | 0 | 0 |

Variations, modifications, and alterations to embodiments of the present disclosure described above will make themselves apparent to those skilled in the art. All such variations, modifications, alterations and the like are intended to fall within the spirit and scope of the present disclosure, limited solely by the appended claims.

While several embodiments of the present disclosure have been described, it is understood that these embodiments are illustrative only, and not restrictive, and that many modifications may become apparent to those of ordinary skill in the art. For example, all dimensions discussed herein are provided as examples only, and are intended to be illustrative and not restrictive.

Any feature or element that is positively identified in this description may also be specifically excluded as a feature or element of an embodiment of the present as defined in the claims.

The disclosure described herein may be practiced in the absence of any element or elements, limitation or limitations, which is not specifically disclosed herein. The terms and expressions which have been employed are used as terms of description and not of limitation, and there is no intention in the use of such terms and expressions of excluding any equivalents of the features shown and described or portions thereof, but it is recognized that various modifications are possible within the scope of the disclosure.

The invention claimed is:

1. A system, comprising:
a roofing substrate; and
a roofing membrane,
wherein the roofing membrane is located on the roofing substrate,
wherein the roofing membrane comprises:
a first layer,
wherein the first layer comprises a polysiloxane,
a second layer,
wherein the second layer comprises a metal having a conductivity, and
a reinforcement layer,
wherein the second layer is located between the first layer and the reinforcement layer.

2. The system of claim 1 wherein the second layer has:
a sufficient thickness, a sufficient metal conductivity and a sufficient area
so as to reduce a static charge on a surface of the first layer by at least 65%, as compared to a control roofing membrane, wherein the control roofing membrane is identical to the roofing membrane except for the second layer.

3. The system of claim 1, wherein the first layer further comprises a polymer.

4. The system of claim 1, wherein the metal of the second layer comprises at least one of copper, aluminum, silver, gold, steel, or brass.

5. The system of claim 1, wherein the first layer contacts and at least partially covers the second layer.

6. The system of claim 1, wherein the roofing membrane further comprises:
a fourth layer,
wherein the fourth layer is between the first layer and the second layer,
wherein the fourth layer comprises a plurality of pores,
wherein polysiloxane is embedded in the plurality of pores.

7. The system of claim 1, wherein the first layer contacts the second layer.

8. The system of claim 1, wherein a thickness of the second layer is 20 mm to 45 mm.

9. The system of claim 1, wherein a percentage of an area of coverage on the first layer is from 50 to 100%.

10. The system, of claim 1, wherein the first layer comprises:
polysiloxane, and
an antistatic additive dispersed throughout the polysiloxane,
wherein the antistatic additive comprises at least one of:
polyethyleneimine,
polymethylsilsesquioxane,
a fatty acid ester,
or any combination thereof,
wherein an amount of antistatic additive is sufficient to reduce by at least 65% a static charge on the first layer when compared to a control roofing membrane without the antistatic additive.

11. The system of claim 10, wherein the antistatic additive comprises 0.5 to 5.0 weight % of polyethyleneimine.

12. The system of claim 10, wherein the antistatic additive comprises 0.5 to 5.0 weight % of polymethylsilsesquioxane.

13. The system of claim 10, wherein the antistatic additive comprises 0.5 to 5.0 weight % of fatty acid ester.

14. The system of claim 10, wherein the fatty acid ester comprises ethoxylated alkyl amine.

15. The system of claim 10, wherein the fatty acid ester comprises ethoxylated alkyl amine.

16. A roofing membrane comprising:
a first layer,
wherein the first layer comprises a polysiloxane,
a second layer,
wherein the second layer comprises a metal having a conductivity, and
a reinforcement layer,
wherein the second layer is located between the first layer and the reinforcement layer.

17. The roofing membrane of claim 16 wherein the second layer has:
a sufficient thickness, a sufficient metal conductivity and a sufficient area, so as to reduce a static charge on a surface of the first layer by at least 65%, as compared to a control roofing membrane, wherein the control roofing membrane is identical to the roofing membrane except for the second layer.

18. The roofing membrane of claim 16, wherein the first layer further comprises a polymer.

19. The roofing membrane of claim 16, wherein the metal of the second layer comprises at least one of copper, aluminum, silver, gold, steel, or brass.

20. The roofing membrane of claim 16, wherein the first layer comprises:
  polysiloxane, and
  an antistatic additive dispersed throughout the polysiloxane,
    wherein the antistatic additive comprises at least one of:
      polyethyleneimine,
      polymethylsilsesquioxane,
      a fatty acid ester,
      or any combination thereof,
    wherein an amount of antistatic additive is sufficient to reduce by at least 65% a static charge on the first layer when compared to a control roofing membrane without the antistatic additive.

* * * * *